(12) United States Patent
Raza et al.

(10) Patent No.: US 11,546,312 B2
(45) Date of Patent: Jan. 3, 2023

(54) DYNAMIC DISASSOCIATED CHANNEL ENCRYPTION KEY DISTRIBUTION

(71) Applicant: Cisco Technology, Inc., San Jose, CA (US)

(72) Inventors: Syed Khalid Raza, Fremont, CA (US); Mosaddaq Hussain Turabi, San Jose, CA (US); Lars Olaf Stefan Olofsson, Dubai (AE); Atif Khan, San Jose, CA (US); Praveen Raju Kariyanahalli, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 17/027,424

(22) Filed: Sep. 21, 2020

(65) Prior Publication Data

US 2021/0006546 A1    Jan. 7, 2021

Related U.S. Application Data

(63) Continuation of application No. 16/021,281, filed on Jun. 28, 2018, now Pat. No. 10,944,733.

(Continued)

(51) Int. Cl.
*H04L 29/06*    (2006.01)
*H04L 9/40*    (2022.01)
(Continued)

(52) U.S. Cl.
CPC .......... *H04L 63/062* (2013.01); *H04L 9/0819* (2013.01); *H04L 9/32* (2013.01); *H04L 9/3215* (2013.01); *H04L 63/0428* (2013.01)

(58) Field of Classification Search
CPC .................................................... H04L 63/062
See application file for complete search history.

(56) References Cited

U.S. PATENT DOCUMENTS

| 5,481,613 | A | 1/1996 | Ford et al. |
| 6,611,913 | B1 | 8/2003 | Carroll et al. |

(Continued)

FOREIGN PATENT DOCUMENTS

| CN | 101697528 A | 4/2010 |
| CN | 104734954 A | 6/2015 |

(Continued)

OTHER PUBLICATIONS

International Search Report and Written Opinion from the International Searching Authority, dated Oct. 8, 2018, 11 pages, for corresponding International Application PCT/US2018/043622.

(Continued)

*Primary Examiner* — Bradley W Holder
(74) *Attorney, Agent, or Firm* — Polsinelli

(57) ABSTRACT

A method may include determining, by a first network device, a type of control channel to open across a transport in a software-defined network (SDN). The method may also include establishing the control channel with a control device via a control plane that is separate from a data plane. The method may further include advertising first security association parameters to the control device via the control channel. The method may include receiving, from the control device via the control channel, second security association parameters associated with a second network device. The method may also include establishing a data plane connection with the second network device using the second security association parameters.

18 Claims, 8 Drawing Sheets

Related U.S. Application Data

(60) Provisional application No. 62/539,431, filed on Jul. 31, 2017.

(51) Int. Cl.
  *H04L 9/08* (2006.01)
  *H04L 9/32* (2006.01)

(56) References Cited

U.S. PATENT DOCUMENTS

| | | | |
|---|---|---|---|
| 7,181,620 B1* | 2/2007 | Hur | H04L 63/061 713/168 |
| 7,350,076 B1* | 3/2008 | Young | H04L 63/08 713/169 |
| 8,582,777 B2 | 11/2013 | Urivskiy et al. | |
| 9,100,346 B2 | 8/2015 | Voit et al. | |
| 9,954,743 B2 | 4/2018 | Lee et al. | |
| 2003/0048905 A1 | 3/2003 | Gehring et al. | |
| 2005/0114518 A1* | 5/2005 | McMahon | H04M 7/1215 709/227 |
| 2008/0115199 A1 | 5/2008 | Young et al. | |
| 2009/0144541 A1 | 6/2009 | Kim et al. | |
| 2012/0283992 A1* | 11/2012 | Ji | H04L 67/34 702/188 |
| 2015/0058954 A1 | 2/2015 | Shah et al. | |
| 2016/0014127 A1 | 1/2016 | Mohebbi | |
| 2016/0119299 A1 | 4/2016 | Amulothu et al. | |
| 2016/0344471 A1 | 11/2016 | Meng et al. | |
| 2016/0366105 A1* | 12/2016 | Smith | H04L 63/061 |
| 2018/0262473 A1 | 9/2018 | Viquez Calderon et al. | |

FOREIGN PATENT DOCUMENTS

| | | |
|---|---|---|
| CN | 104917750 A | 9/2015 |
| CN | 105052113 A | 11/2015 |
| CN | 108028831 A | 5/2018 |
| EP | 3662632 A1 | 6/2020 |
| JP | 2016-528630 A | 9/2016 |
| WO | WO 2016/000160 A | 1/2016 |
| WO | WO 2016/202269 A2 | 12/2016 |
| WO | 2017052507 A1 | 3/2017 |

OTHER PUBLICATIONS

Liyanage, Madhusanka, et al., "Secure communication channel architecture for Software Defined Mobile Networks," Computer Networks, Elsevier, Amsterdam NL, Jan. 16, 2017, pp. 32-50.
First Office Action and Search Report dated Sep. 29, 2021, 13 pages, issued by the China National Intellectual Property Administration for corresponding Chinese Patent Application No. 201880049784.3.
Reasons for Refusal with English translation, dated May 14, 2021, 11 pages, issued by the Japan Patent Office for corresponding Japanese Patent Application No. 2020-503029.

* cited by examiner

DYNAMIC DISASSOCIATED CHANNEL ENCRYPTION KEY DISTRIBUTION

CROSS-REFERENCE TO RELATED APPLICATIONS

This application is a continuation and claims the benefit of U.S. Non-Provisional patent application Ser. No. 16/021,281, filed Jun. 28, 2018, which claims the benefit of U.S. Provisional Patent Application No. 62/539,431, filed Jul. 31, 2017, the full disclosures of which are incorporated herein by reference in their entireties.

FIELD

The embodiments discussed in the present disclosure are related to dynamic disassociated channel encryption key distribution.

BACKGROUND

The use of networks is a useful tool in allowing communication between distinct computing devices. Despite the proliferation of computers and networks over which computers communicate, there still remains various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include determining, by a first network device, a type of control channel to open across a transport in a software-defined network (SDN). The method may also include establishing the control channel with a control device via a control plane that is separate from a data plane. The method may further include advertising first security association parameters to the control device via the control channel. The method may include receiving, from the control device via the control channel, second security association parameters associated with a second network device. The method may also include establishing a data plane connection with the second network device using the second security association parameters.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
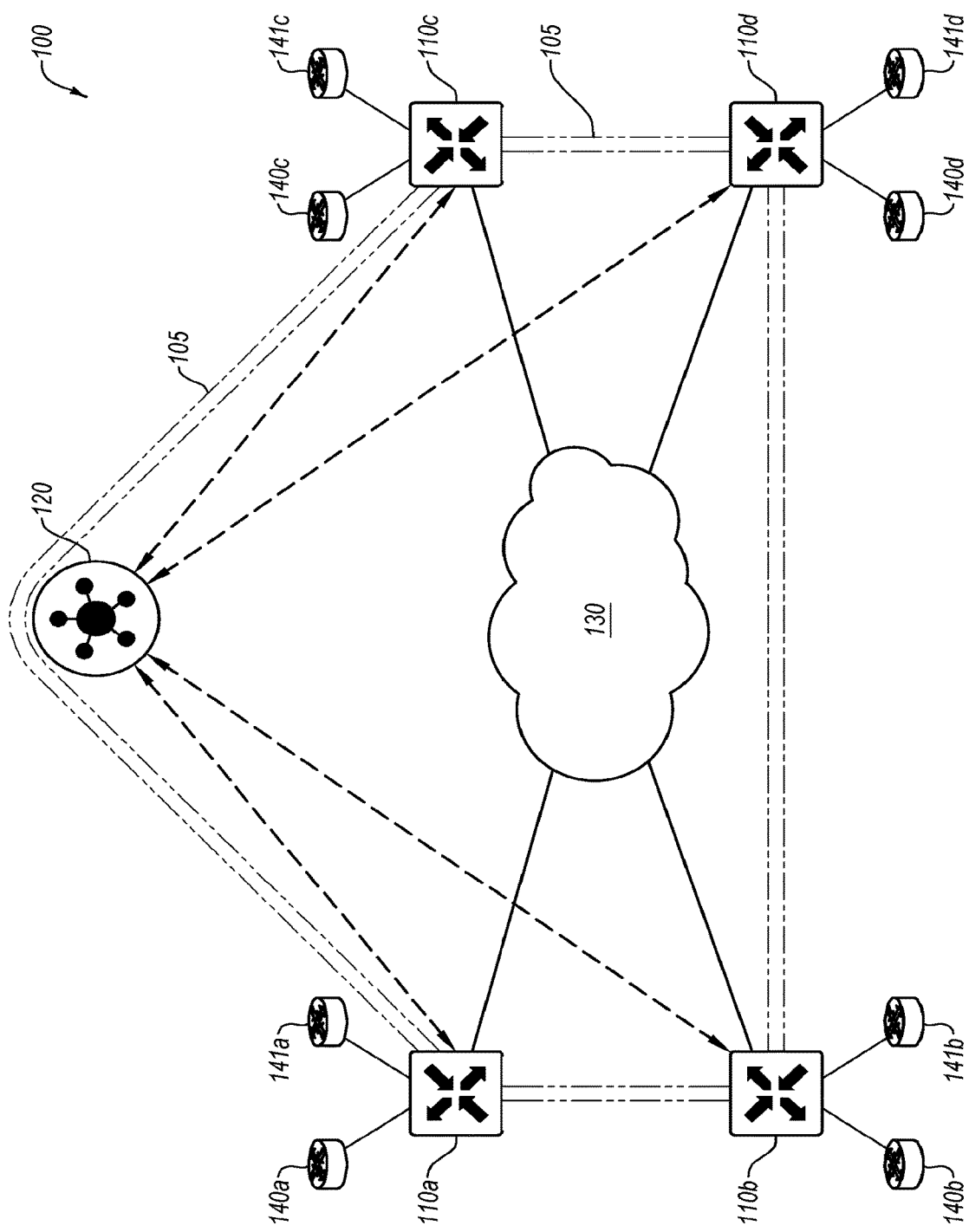
FIG. 1 illustrates an example system of network components implementing a software-defined network (SDN)

Encryption is a cornerstone function of a majority of data exchanges taking place across modern communications networks. Challenges involved in authenticating endpoints, establishing secure control and data paths along with the exchange of encryption keys are significant. One of the many challenges in establishing secure communications channels is to provide the ability for authentication information and encryption keys to be exchanged between endpoints without the exchange being subject to a so called man-in-the-middle attack. A man-in-the-middle attack involves the eavesdropping and potential modification of the exchanged information by a third party such that the third party may intercept the exchanged information. Some conventional technologies that are used to mitigate man-in-the-middle attacks include Diffie-Hellman and Elliptic Curve Digital Signature Algorithm (ECDSA).

Aspect of the present disclosure address these and other shortcomings of conventional approaches to mitigate various security flaws in conventional networks. For example, the present disclosure addresses a challenge of having to provide secure communications across an insecure medium by using a relatively secure and disassociated channel for authentication and encryption key exchanges. The disassociated channel provides the same functionality as the insecure channel from a data and control protocol handling point of view with the added benefit that the implementer of a given network can decide that a communications channel be used that provides a certain trust level, reducing the likelihood of a man-in-the-middle attack. Since most any private communications network (e.g. an MPLS, Leased Line TDM or private Frame/ATM network) typically may provide a better level of security and integrity than the open Internet, the present disclosure may significantly improve the security of any exchange of encryption and authentication information by using the private network as a disassociated channel for the Internet. Since hardly any network can be deemed to be absolutely secure, a given set of authentication and secure exchange functions may still be used without relaxing any requirements.

The present disclosure provides a protocol that has the ability to identify a specific path that it is carrying information about, specifically local communications path information of the originator of a given protocol advertisement and associated messages. The present disclosure may also provide an out-of-band mechanism to gather information about local communications paths that is to be advertised across a channel disassociated from those aforementioned paths of communication. The present disclosure may further provide a protocol that carries all the information required to establish encrypted communications channels across paths where the protocol is not specifically operational, i.e. disassociated paths. The present disclosure may also provide an ability within the aforementioned protocol to uniquely identify each advertised local path and the shared or unique encryption parameters associated with each local path. The present disclosure may further provide an ability for a local encryption endpoint to establish encrypted communications across paths that may or may not be subject to Network Address Translation (NAT, IETF RFC2663) while managing those paths as disassociated from the control channel path. Another benefit of the present disclosure may include the use of a control protocol different from the protocol running on the disassociated channel or path, for the purpose of discovering potential Network Address Translation conditions for other local paths.

In at least some embodiments, a system may include a network that uses a private network and a public Internet for interconnecting sites, where the private network and/or the Internet can be used in either a primary or backup capacity as suitable for site-to-site connectivity or specific applications making use of different communication path profiles. Communication across both networks may be secured and may be encrypted. An example deployment may engage both a control plane protocol and a data plane protocol in an identical (or close to identical) fashion for both networks, where the parameters specific to both networks may be exchanged over each individual network.

Embodiments of the present disclosure may provide improvements to computer networks and to the operation of computers themselves. For example, using one or more embodiments of the present disclosure, network traffic may be more secure and less vulnerable to sniffing and man-in-the-middle attacks. Embodiments of the present disclosure are explained with reference to the accompanying drawings.

FIG. 1 illustrates an example system 100 of network components implementing a software-defined network (SDN), in accordance with one or more embodiments of the present disclosure. The SDN may include any type of network or network topology. For example, the SDN may include a software-defined wide area network (SD-WAN), software-defined local area network (LAN), software-defined metropolitan area network (MAN), or any other type of network. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

For ease and clarity in explanation, some examples of the present disclosure are described with respect to a WAN where the network is managed at least partially by software rather than controlled by hardware. As such, the SDN may support multiple types of connections or communication links, such as the Internet, MultiProtocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, the SDN may support load balancing or load sharing between the various connections. Further, because of the distributed nature of some networks, the SDN may support virtual private networks (VPNs), firewalls, and other security services. In an SD-WAN, for example, a control plane may be functionally separated from the physical topology. In some embodiments, the SDN may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, the control device 120 may form a control plane connection with each of the edge network devices 110. The control plane connection may facilitate the exchange of data between the edge network devices 110 and the control device 120 for management and control of the internal network domain 105. The control plane connection may operate via a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining available, optimal or desired paths across the communication network 130 between and among the edge network devices 110. Additionally or alternatively, data transmitted over the control plane connection may facilitate the edge network devices 110 determining available, optimal or desired paths across the communication network 130 between and among the edge network devices 110. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical and/or logical connections available to the edge network devices 110 through the communication network 130. In some embodiments, the edge network devices 110 may include one or more physical and/or logical connections to each other. In these and other embodiments, the control device 120 may generate and/or update one or more policies in conjunction with the central route table to help the edge network devices 110 to determine data traffic routes through the internal network domain 105. For example, the control device 120 may provide policies and other configuration preferences related to traffic flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. In these and other embodiments, the edge network devices 110 may route traffic through a most direct route, a most cost effective route, a most reliable route, or through some other route based on one or more other policies received from of the control device 120, characteristics of the traffic, characteristics of the route path, a source edge network device 110, and a destination (e.g., edge network device 110).

In some embodiments, the one or more policies may include guidance regarding determining next-hop and route path instructions. For example, a particular policy may instruct a particular edge network device 110 where to route the traffic next for a particular category, class, or group of traffic flows, rather than providing a complete end-to-end route for the traffic. For example, the edge network device 110*a* may receive data from an external network device 140*a* directed to an address of the external network device 141*c*. The edge network device 110*a* may have stored a first policy that the network device 110*a* may use to determine the route path for the data, including that a "next-hop" for network traffic destined for the address of the external network device 141*c* is to be routed to the edge network device 110*d*.

In some embodiments, the control device 120 may generate policies to cause certain network traffic flows within the internal network domain 105 to be routed over certain types of connections or communication links (e.g., LTE, Internet, MPLS) and/or through certain edge network devices 110. In some embodiments, a link classification may indicate a type of communication link. The edge network devices 110 may make routing decisions in fast path (e.g., as a packet is travelling through the network). The edge network devices 110 may use a policy to determine an action. For example, for a given set of data, the policy may indicate that a first routing path may be selected based on a configuration preference and based on a type or classification of a communication link. The edge network devices 110 may also determine an action (e.g., determine a route path) for all packets from a particular source, all packets that originated from a particular computer laptop, a type of traffic (e.g., voice), etc. In another example, a policy have a configuration preference that may indicate that all flows with IP addresses in the range 100.1/16 may be categorized as voice flows. When the edge network devices 110 is connected to three different communication links (e.g., an Internet link an MPLS link, a cellular link). The configuration preference may indicate that voice traffic is to be routed over the Internet link. Thus, the edge network devices 110 may route all flows with IP addresses in the range 100.1/16 over the Internet link. Other examples of configuration preferences may include costs (e.g., monetary, time, route, hops, transport health (such as loss, latency, and/or jitter), bandwidth, path geography, source (e.g., device, geography, user), destination (e.g., device, geography, user), applications (e.g., business, social), user groups (e.g., finance on a first subnet IP, HR on a second subnet IP, engineering on a third subnet IP, among others. Any type of data or information may be used as a configuration preference. In an example, the edge network device 110 may identify metadata associated with the traffic, such as a header. The header may include a DSCP value in the header to indicate a predefined routing path. The edge network device 110 may also make routing decisions based on a specific application (which may sometimes be referred to as a layer 7 header or http header). For example, the edge network device 110 may route OFFICE365 traffic on a first path and SALESFORCE traffic on a second path.

In some embodiments, the control device 120 may facilitate authentication of an edge network device 110. The control device 120 may also facilitate the configuration of the data plane. In at least some embodiments, to setup the data plane, the edge network device 110 may generate a set of security association parameters for the edge network device 110. The security association parameters may include information that other edge network devices may use to authenticate with and/or connect to the edge network device 110. For example, the security association parameters may include one or more keys, certificates, etc. The edge network device 110 may send the security association parameters to the control device 120. The control device 120 may send the security association parameters to other edge network devices that are allowed to connect to the edge network device 110. Further details of the control device 120 being use to facilitate the configuration of the control plane and the data plane are described in conjunction with FIGS. 3-7.

In some embodiments, traffic among the edge network devices 110 and traffic between the edge network devices 110 and the control device 120 may be encrypted, such as with two-way authentication using Advanced Encryption Standard (AES) with a 256-bit length key over one or more Datagram Transport Layer Security (DTLS) and/or Transport Layer Security (TLS) connections between edge network devices 110.

In some embodiments, the control device 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the control device 120. In some embodiments, the authentication information may be used when the edge network devices 110 first comes on line to establish the control plane connection, and any device without a control plane connection with the control device 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), Bi-directional Forwarding Detection (BFD), among others. Additionally or alternatively, the edge network devices 110 may support other network functionalities such as differentiated services code point (DSCP) tagging or type of service (TOS) tagging, Quality of Service (QoS) monitoring, Service Level Agreements (SLA), Internet Protocol (IP) forwarding, Internet Protocol Security (IPsec), Access Control Lists (ACL), among others.

For example, with DSCP or TOS tagging, the edge network devices 110 may be configured to insert a DSCP or TOS tag into a packet header. Such a DSCP or TOS tag may identify one (or a preferences for one) communication link of multiple communication links on which to send certain types of network traffic. Based on the DSCP or TOS tag, the edge network devices 110 may route the network traffic via one or more types of communication link.

As an additional example, with IPsec, the edge network devices 110 may use IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

As another example, with ACLs, the edge network devices 110 may include a set of rules indicative of one or more addresses, hosts, and/or networks that may be permitted to use a given port or a particular communication link. In these and other embodiments, the edge network devices 110 may include ACLs that are applicable to inbound traffic, outbound traffic, or both.

In some embodiments, the edge network devices 110 may locally maintain one or more route tables. In some embodiments, the edge network devices 110 may adjust or modify the route tables based on one or more policies sent from the control device 120. For example, one or more entries may be removed, discarded, or otherwise not added to the route tables by the edge network devices 110 based on the one or more policies. In some embodiments, the edge network devices 110 may include logic to update, modify, and/or generate the route tables based on policies from the control device 120 and/or from traffic handled by the edge network devices 110. The one or more route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
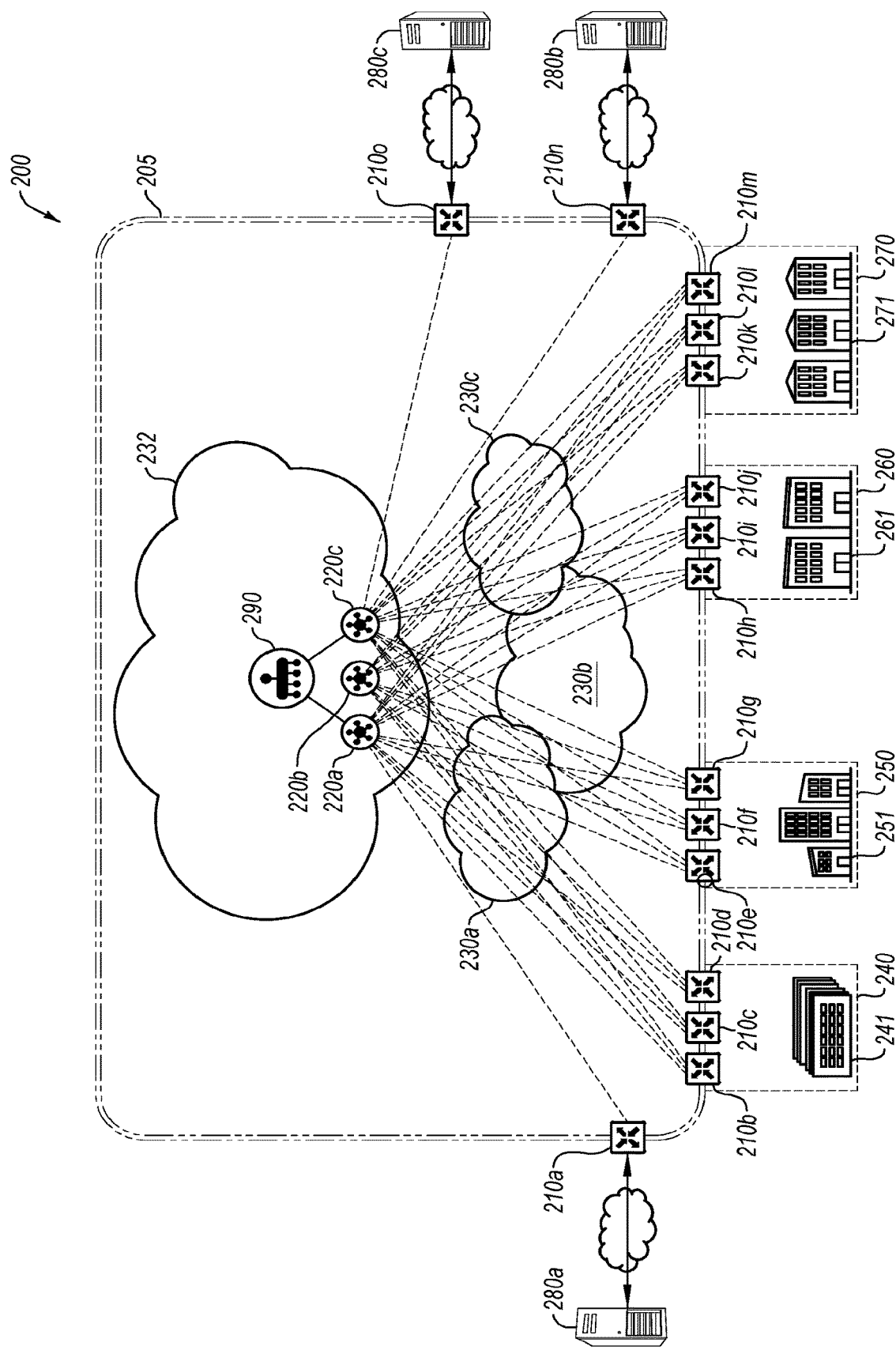
FIG. 2 illustrates another example system implementing a SDN.

FIG. 2 illustrates another example system 200 of network components implementing a SDN, in accordance with one or more embodiments of the present disclosure. The system 200 may include one or more edge network devices 210 (such as edge network devices 210*a*-210*o*), one or more control devices 220 (such as control devices 220*a*, 220*b*, and 220*c*), and one or more communication networks 230 (such as communication networks 230*a*, 230*b*, and 230*c*). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains.

The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280*a*-280*c*). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210n may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, Quick-Books®, and/or others), media services (such as YouTube®, NetFlix®, Pandora®, Spotify®, and/or others), and/or others. In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network.

In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may use the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210e in the external network domain of the campus 250. The data flow may go from the edge network device 210e to one of the edge network devices 210b, 210c, and/or 210d associated with the data center 240 through the internal network domain 205. The one of the edge network devices 210b, 210c, and/or 210d may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may input policies via the network management device 290 that may be communicated to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others.

In some embodiments, the network management device 290 may be configured to authenticate and/or recognize approved edge network devices 210 and/or control device 220. For example, the network management device 290 may maintain a list of serial numbers, MAC addresses, or security association parameters, other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to generate and/or store configurations of one or more edge network devices 210 and/or control devices 220. For example, a network administrator may use the network management device 290 to configure a particular edge network device 210 and may store that configuration as a template that may be applied to future edge network devices. Additionally or alternatively, a template for the edge network devices 210 may be provided by a third party and applied to a new edge network device 210. In these and other embodiments, a template for the control devices 220 may be generated, stored, and/or applied to a new control device 220. Additionally or alternatively, such a template may be used to automatically configure a newly deployed edge network device 210. For example, the newly deployed edge network device 210 may be brought online and connected to a corresponding control device 220. The corresponding control device 220 may verify the serial number of the edge network device 210 with the network management device 290, and may obtain a template from the network management device 290 for the edge network device 210. The control device 220 may send the template to the edge network device 210 to be automatically installed to configure the edge network device 210 according to the template.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
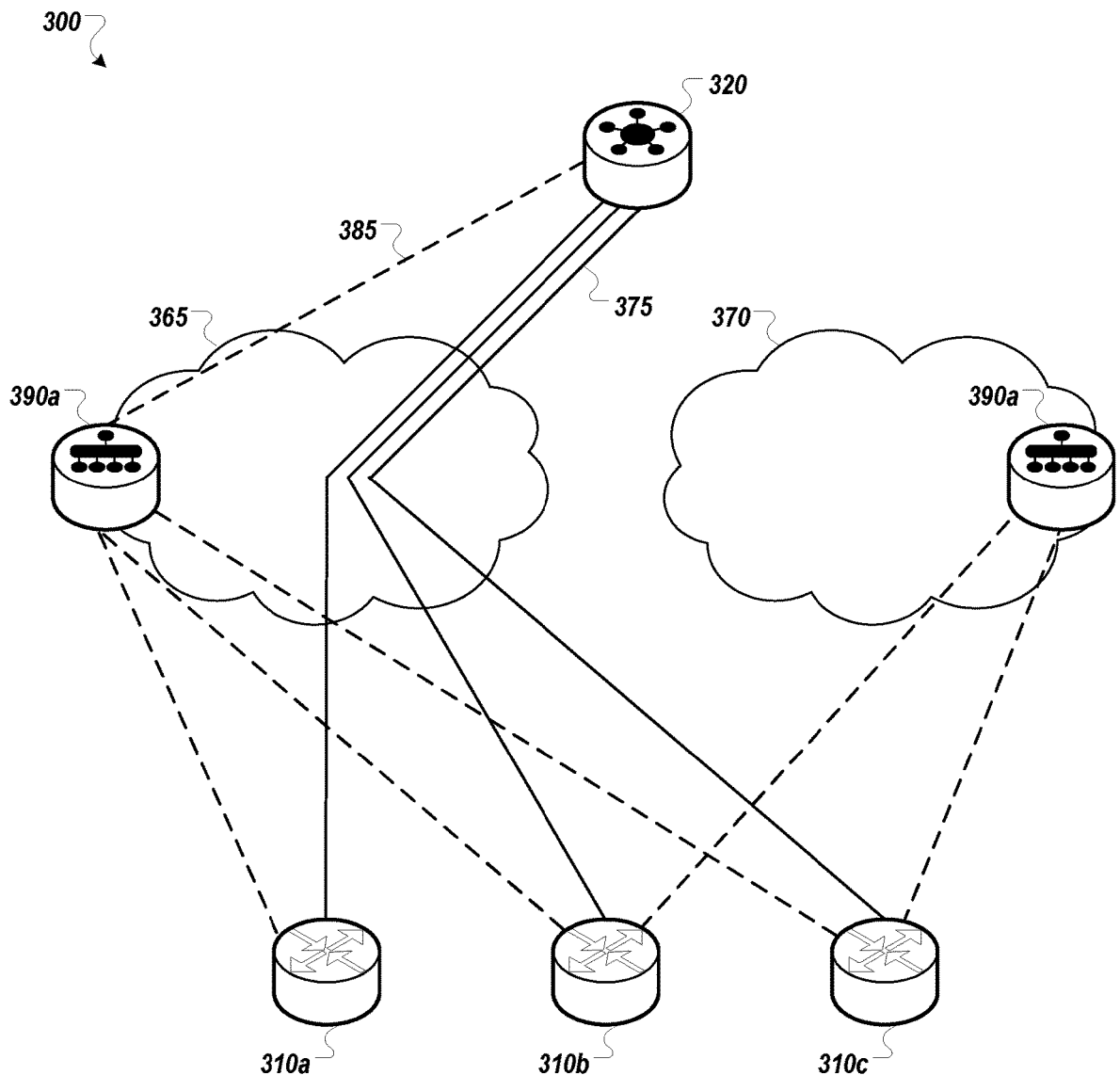
FIG. 3 illustrates an example system of a control plane implementation.

FIG. 3 illustrates an example system 300 of a control plane 305 implementation, in accordance with one or more embodiments of the present disclosure. FIG. 3 illustrates a control device 320 that may include multiple potential communication links for communicating across the control plane 305 to the edge network devices 310a, 310b and 310c. The control plane 305 may be implemented in a secure and/or private network. For example, the control device 320 may communicate across the control plane 305 using a private transport 365. The edge network devices 310a and 310b may be similar or comparable to the edge network device 110 of FIG. 1 and/or the edge network devices 210a-210o of FIG. 2. The control device 420 may be similar or comparable to the control device 120 of FIG. 1, and/or 220 of FIG. 2. Any number of control devices may be used.

The control device 320 may support the control plane 305 between the edge network devices 310. The control device 320 may receive and advertise routing and encryption information between the edge network devices 310. The edge network devices 310 may not establish control plane channels between each other, but may establish a data plane connection between each other, as further described in conjunction with FIG. 4.

In at least some embodiments, the system 300 may include a network management device 390 that may communicate with the control devices 220 over a management network 232. The network management device 290 may provide management and control of one or more devices via a passive portion of the control plane 315, including the edge network devices 310, the control devices 320, and/or others. Devices may connect to and communicate with the network management device 390 via the passive portion of the control plane 315. The network management device 390 may be similar or comparable to the network management device 290 of FIG. 2.

In at least some embodiments, the network management device 390 may be responsible for assisting with the discovery of network address translation (NAT) traversal information for each connecting endpoint (e.g., edge network devices 310, the control devices 320, and/or others). The network management device 390 may also provide location and session information for the control device 320 and may share the session information with the edge network devices 310 and/or other control devices (not illustrated in FIG. 3). In at least some embodiments, the system 300 may include a public network 370. The data plane may not be established via the public network 370. In these embodiments, a first network management device 390a may coordinate activities for the private network 365 and a second network management device 390b may coordinate activities for the public network 370. For example, when the public network 370 includes the Internet, the second network management device 390b may assist with NAT traversal that may be specific to the Internet domain.

In at least some embodiments, the edge network device 310 may receive one or more keys associated with other edge network devices 310 from the control device 310 via the control plane 305. For example, one or more data packets may use one or more keys for security purposes in transmitting data from one edge network device 310 to another edge network device 310. In these and other embodiments, the control device 320 may reflect the received keys to one or more other edge network devices 310 based on a central route table and/or the policies implemented by the control device 320. In these and other embodiments, a given edge network device 310 may generate symmetrical keys to facilitate establishment of a data plane (e.g., data plane 405 of FIG. 4) for secure communication between edge network devices. In these and other embodiments, a pair of symmetrical keys may be generated by the given edge network device 310, with one remaining with the given edge network device 310 and the other provided to the control device 320 such that the control device 320 may distribute the other symmetrical key via the control plane 305 (and not a data plane) to other edge network devices that communicate with the given edge network device 310. In such a way, each edge network device that is to communicate with the given edge network device 310 based on the policies of the control device 320 may receive the symmetrical key outside of the data plane.

Modifications, additions, or omissions may be made to FIG. 3 without departing from the scope of the present disclosure. For example, while illustrated as including a certain number of edge network devices 310, the system 300 may include any number of edge network devices 310. As another example, while illustrated as including one control device 320, any number of control devices may be used. As another example, while illustrated as including two network management devices, any number of network management devices may be used. As another example, while illustrated as including one private network 365 and one public network 370, any number of private networks and public networks may be used.

Figure 4:
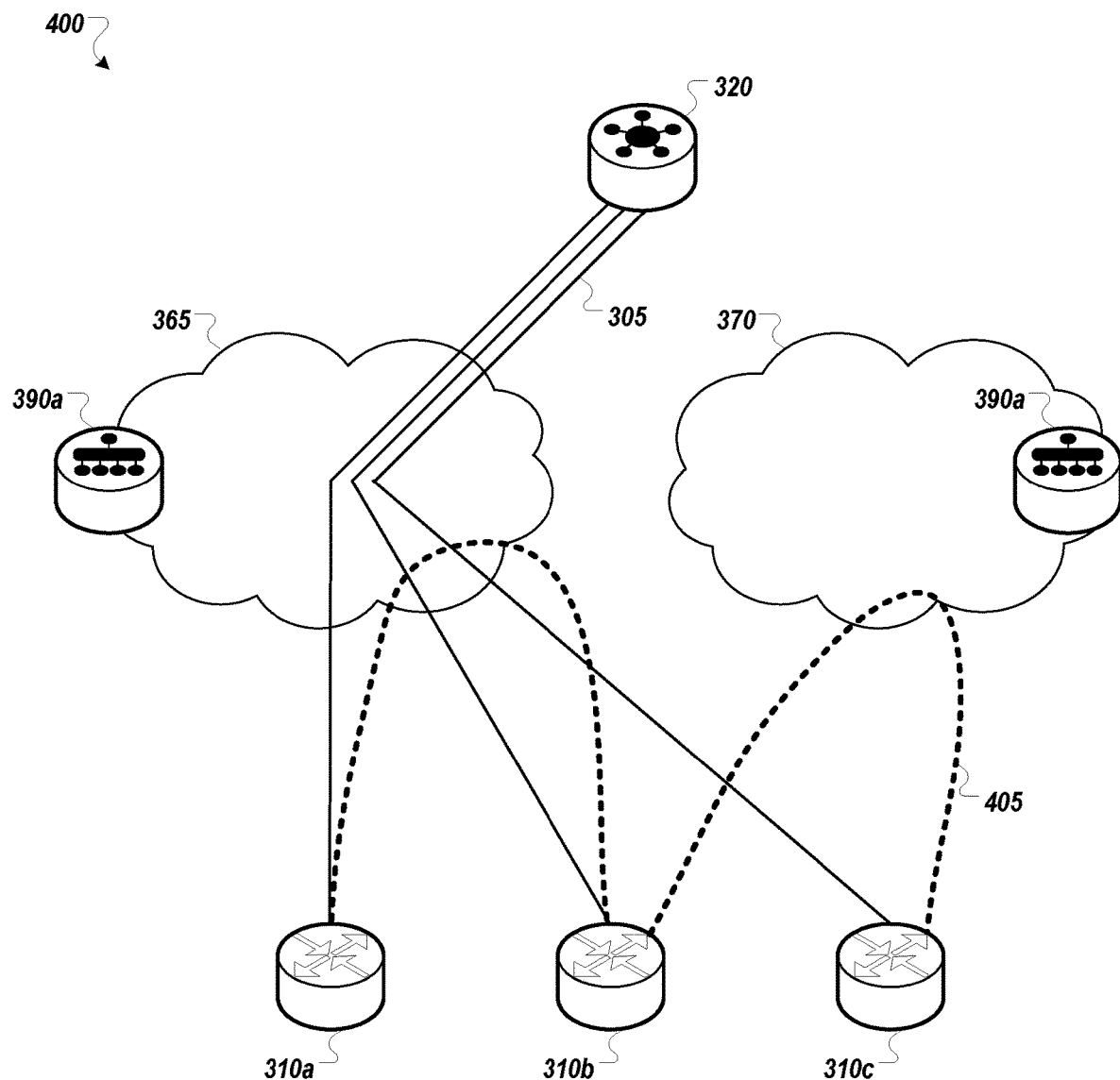
FIG. 4 illustrates another example system of a data plane implementation.

FIG. 4 illustrates another example system 400 of a data plane 405 implementation, in accordance with one or more embodiments of the present disclosure. The system 400 may include the control plane 305, the edge network devices 310, the control devices 320 and the network management devices 390 of FIG. 3.

The control plane 305 may be implemented in the private network 365 and may use active signaling. The data plane 405 may be independent and separate from the control plane and may be implemented in the public network 370. The control plane 305 may provide a disassociated path function relative to the data plane 405. For purposes of example, the system 300 includes the private network 365 and the public network 370, although both networks could be the same type, such as both being private or both being public.

For paths that use the private network 365, each edge network device 310 may authenticate with the network management device 390 (if the network management device is part of the system 400) and then with the control device 320. Encryption keys are advertised by the edge network device 310 to the control device 320. The control device may then advertise endpoint information (e.g., security association parameters), inclusive of encryption keys, to each edge network device 310 for all other edge network devices 310 except for the target for the advertisement. The edge network device 310 may actively establish the data plane 405, including establishing encryption along the data plane 405, with all other endpoints attached to the private network 365 based on the information received from the control device 320.

For paths that use the public network 370, each edge network device 310 may authenticate with the network management device 390, which may provide the edge network devices 310 with potential NAT traversal information. Encryption keys for the Internet path may be advertised by the edge network devices 310 to the control device 320. The control device 320 may advertise this additional endpoint information, inclusive of encryption keys, to each endpoint for all other endpoints except the target edge device 310 for the advertisement. Each edge network device 310 is now in a position to also establish the encrypted data plane 405 across the public (e.g., Internet) paths, without having sent information related to the encryption across that same path.

Modifications, additions, or omissions may be made to FIG. 4 without departing from the scope of the present disclosure. For example, while illustrated as including a certain number of edge network devices 310, the system 400 may include any number of edge network devices 310. As another example, while illustrated as including one control device 320, any number of control devices may be used. As another example, while illustrated as including two network management devices 390, any number of network management devices may be used. As another example, while illustrated as including one private network 365 and one public network 370, any number of private networks and public networks may be used.

Figure 5:
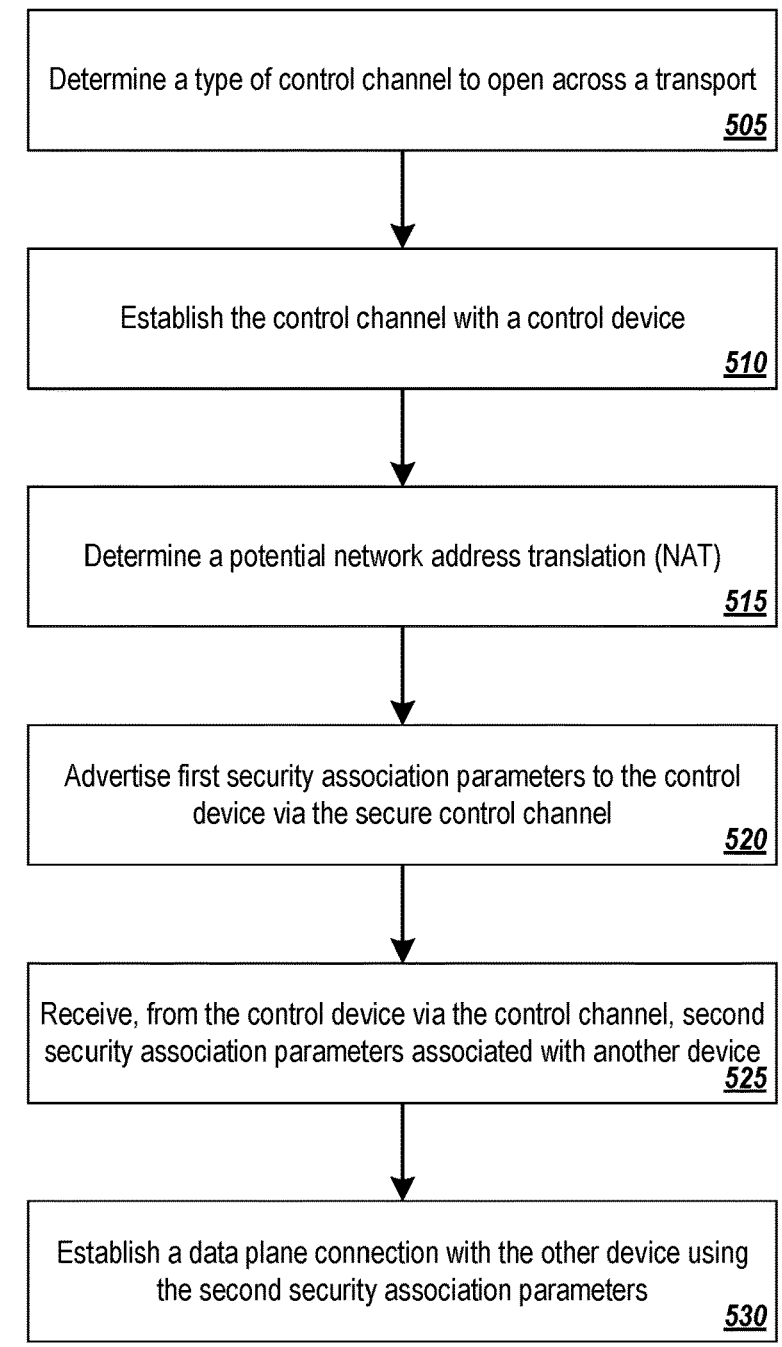
FIG. 5 illustrates a flowchart of an example method of establishing a control plane and a data plane within a SDN.

FIG. 5 illustrates a flowchart of an example method 500 of establishing a control plane and a data plane within a SDN, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the network devices (e.g., the edge network devices 110, 210 or 310 of FIGS. 1-4), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 505, where the processing logic may determine a type of control channel to open across a transport in a software-defined network (SDN). The processing logic may locally discover the type of the control channel by identifying one or more transports that are communicatively coupled to the processing logic and/or to a respective edge network device. The type of transport may influence the type of control channel. The processing logic may also determine how many control channels to open across each transport. In at least some embodiments, the processing logic may establish one control channel across each transport. In at least some embodiments, the processing logic may establish multiple control channels across one or more transports. In at least some embodiments, the processing logic may establish a particular number of control channels based on the transport type. For example, a transport type with higher security and/or bandwidth may have more control channels as compared to other transport types.

At block 510, the processing logic may establishing the control channel with a control device via a control plane that is separate from a data plane. In at least some embodiments, the processing logic may establish the types and numbers of control channels as determined at block 505. The control channels may include secure control channels. The processing logic may also establish one or more control channels with one or more network management devices, such as the network management device 290 or 390 of FIGS. 2 and 3, respectively. In an example, a system may include an MPLS transport and an Internet transport. The processing logic may establish at least one control channel over the MPLS transport and at least one control channel over the Internet transport.

At block 515, the processing logic may determine a potential network address translation (NAT) for an upstream path toward the control device and/or toward the network management device. In at least some embodiments, the processing logic may determine the NAT for a public network. The processing logic may trace one or more paths to the control device and/or the network management device, while noting any NAT that may occur along the path. The processing device may store the NAT in a data storage.

At block 520, the processing logic may advertise first security association parameters to the control device via the control channel. In at least some embodiments, the processing logic may generate the first security association parameters. The first security association parameters may be associated with a first edge network device. The processing logic may authenticate with the control device using an authentication protocol. In at least some embodiments, the processing logic may authenticate with a network management device prior to authenticating with the control device. The first security association parameters may include a key, a key pair, a set of keys, a certificate, a token, or any other object that may be used by another device to identify, authenticate with, and connect to the first edge network device via a channel other than the control channel. The control device may receive the first security association parameters and may receive other security association parameters from other devices. The control device may send some, any or all of the received security association parameters to permitted device, as further described in conjunction with FIG. 6.

At block 525, the processing logic may receive, from the control device via a control channel, second security association parameters associated with a second network device. At block 530, the processing logic may establish a data plane connection with the second network device using the second security association parameters One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
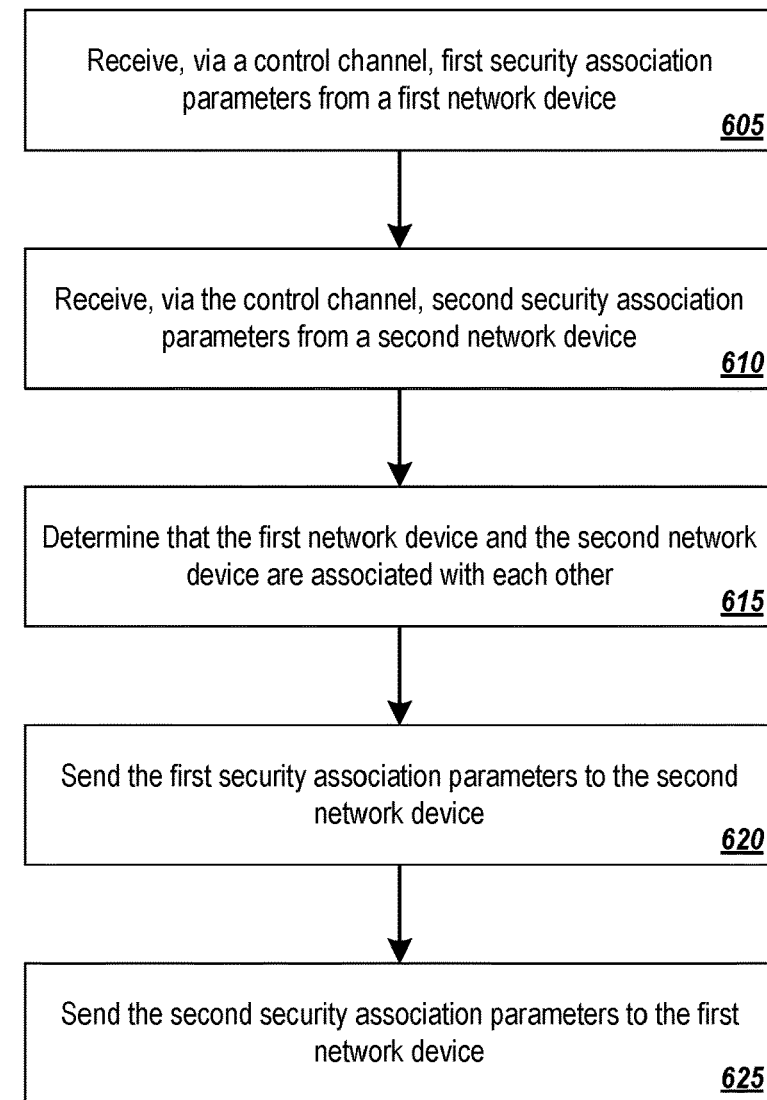
FIG. 6 illustrates a flowchart of another example method of establishing a control plane and a data plane within a SDN.

FIG. 6 illustrates a flowchart of another example method 600 of establishing a control plane and a data plane within a SDN, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the control devices (e.g., the control devices 120, 220, or 320 of FIGS. 1-4), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 600 may begin at block 605, where the processing logic may receive, via a first control channel associated with a control plane, first security association parameters from a first network device. Similarly, at block 610, the processing logic may receive, via a second control channel associated with the control plane, second security association parameters from a second network device. The processing logic may receive any number of security association parameters from any number of network devices.

At block 615, the processing logic may determine that the first network device and the second network device are associate with each other. For example, the processing logic may determine that the first network device and the second network device are associated with a single entity (e.g., corporation) and are thus permitted to connect to each other via a data plane.

At block 620, the processing logic may send the first security association parameters to the second network device. Similarly, at block 625, the processing logic may end the second security association parameters to the first network device. Using the exchange of security association parameters that were shared via the control plane (and not a data plane), the first network device and the second network device may establish the data plane between each other.

One skilled in the art will appreciate that, for these processes, operations, and methods, the functions and/or operations performed may be implemented in differing order. Further, the outlined functions and operations are only provided as examples, and some of the functions and operations may be optional, combined into fewer functions and operations, or expanded into additional functions and operations without detracting from the essence of the disclosed embodiments.

Figure 7:
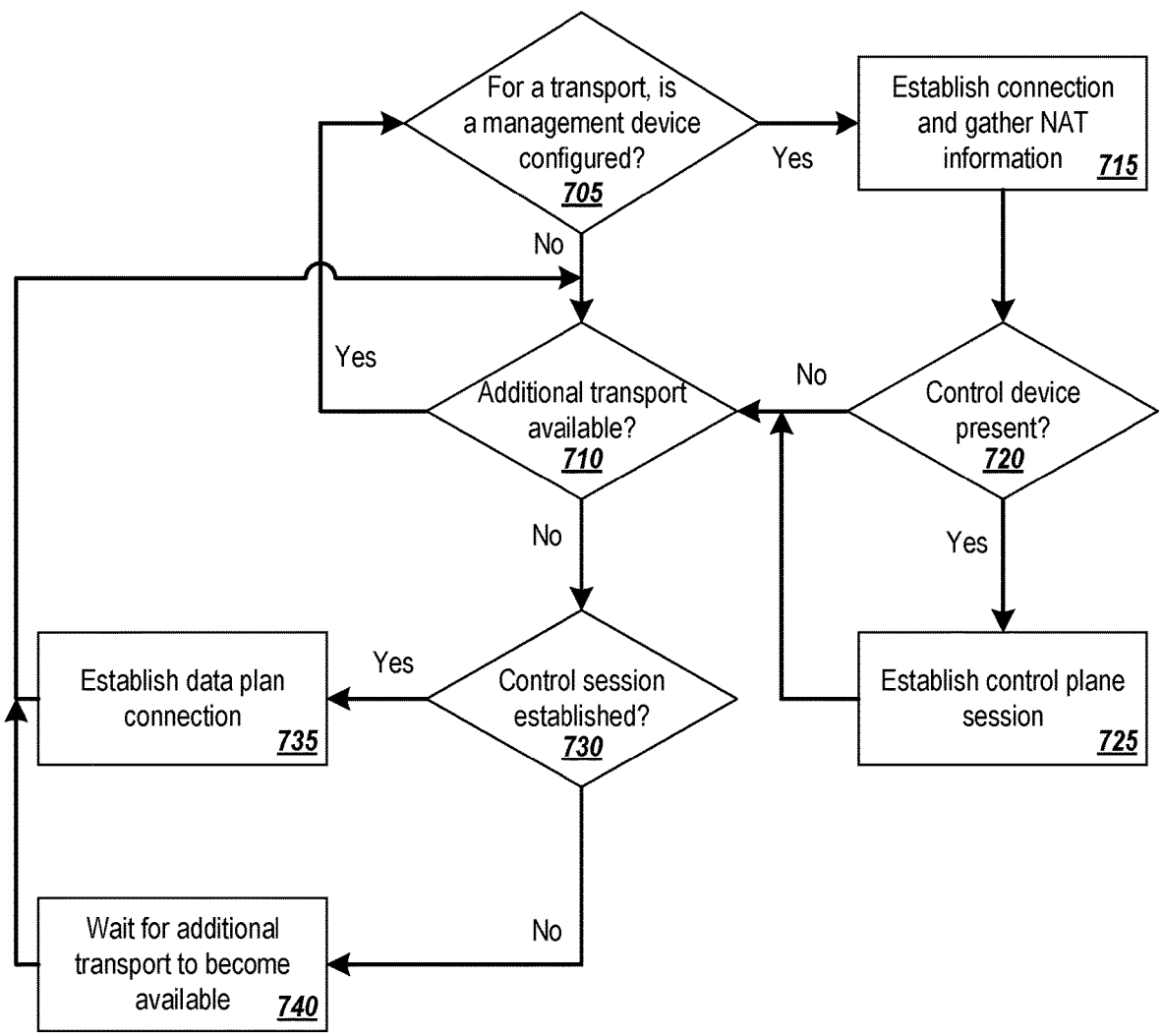
FIG. 7 illustrates a flowchart of another example method of establishing a control plane and a data plane within a SDN.

FIG. 7 illustrates a flowchart of another example method 700 of establishing a control plane and a data plane within a SDN, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the control devices (e.g., the control devices 120, 220, or 320 of FIGS. 1-4), the network devices (e.g., the edge network devices 110, 210 or 310 of FIGS. 1-4), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

For ease in explanation, the processing logic may be associated with an edge network device with two transport connections—one to a private network, and one to a public network (e.g., the Internet). Under method 700, a list of transport connections may be generated and later used to establishment of data plane sessions with various devices, as described below. The data plane sessions may be established serially, or at least partially in parallel.

The method 700 may begin at block 705, where the processing logic may determine whether a management device is configured for a particular transport. When a management device is not configured for a particular transport (e.g., "NO") at block 705, the processing logic may determine whether any additional transports are available at block 710. When any additional transports are available at block 710 (e.g., "YES") at block 710, the processing logic may configure the management device with the other transports and advance to block 705.

When a management device is configured for a particular transport (e.g., "YES") at block 705, the processing logic may establish a connection with the management device and may begin to gather network address translation (NAT) information at block 715. At block 720, the processing logic may determine whether a control device is present with a network. When a control device is present with the network (e.g., "YES") at block 720, the processing logic may establish a control plane session with the control device at block 725. The processing logic may proceed to block 710.

When a control device is not present with the network (e.g., "NO") at block 705, the processing logic may determine whether additional transports are available at block 710. When any additional transports are not available at block 710 (e.g., "NO") at block 710, the processing logic may determine whether a control session has been established for all transports at block 730.

When a control session has been established for all transports (e.g., "YES") at block 730, the processing logic may establish a data plane connection with other authorized edge network devices. When a control session has not been established for all transports (e.g., "NO") at block 730, the processing logic may wait for additional transports to become available at block 740.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 8:
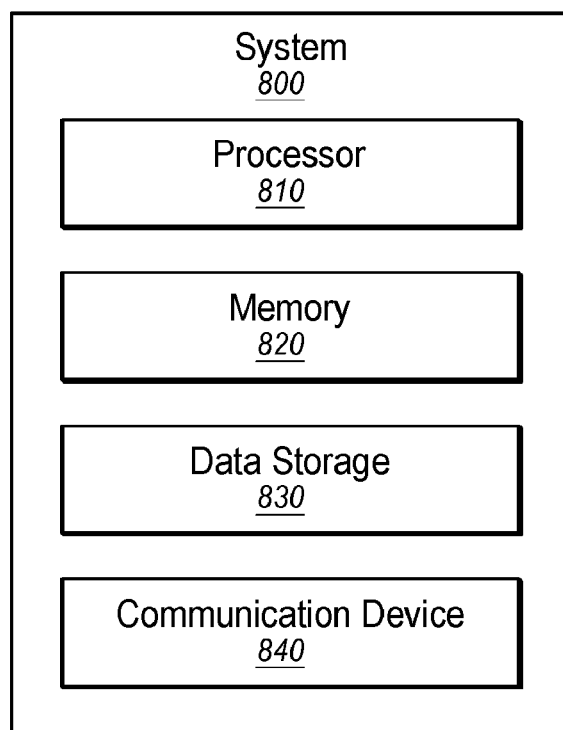
FIG. 8 illustrates an example computing system.

FIG. 8 illustrates an example computing system 800, according to at least one embodiment described in the present disclosure. The system 800 may include any suitable system, apparatus, or device configured to test software. The computing system 800 may include a processor 810, a memory 820, a data storage 830, and a communication unit 840, which all may be communicatively coupled. In some embodiments, any of the network devices (e.g., the edge network devices 110, 210, or 310 of FIGS. 1-4), control devices (e.g., the control devices 120, 220, or 320 of FIGS. 1-4) or other computing devices of the present disclosure may be implemented as the computing system 800. Additionally or alternatively, one or more of the network devices, control devices, local computing devices or other computing devices may be implemented as virtualized machines operating on a physical computing system such as the computing system 800.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform the methods 500, 600, and/or 700 FIGS. 5-7, respectively. For example, the processor 810 may determine that a traffic flow is associated with a rerouting application and reroute the traffic flow along the path with the best performance score. As another example, the processor 810 may rewrite DNS queries and/or DNS replies. As an additional example, the processor 810 may route flows such that an NAT exit point associated with a rerouted path may be used. As an additional example, the processor 810 may determine which path from multiple paths is the best path and reroute traffic accordingly.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network, such as an MPLS connection, the Internet, a cellular network (e.g., an LTE network), etc. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 840 may permit data to be exchanged with a network and/or any other devices or systems described in the present disclosure. For example, the communication unit 840 may allow the system 800 to communicate with other systems, such as network devices, control devices, and/or other networks.

Modifications, additions, or omissions may be made to the system 800 without departing from the scope of the present disclosure. For example, the data storage 830 may be multiple different storage mediums located in multiple locations and accessed by the processor 810 through a network.

As indicated above, the embodiments described in the present disclosure may include the use of a special purpose or general purpose computer (e.g., the processor 810 of FIG. 8) including various computer hardware or software modules, as discussed in greater detail below. Further, as indicated above, embodiments described in the present disclosure may be implemented using computer-readable media (e.g., the memory 820 or data storage 830 of FIG. 8) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method, comprising:
   receiving, at a controller of a first network through a control plane, first security association parameters from a first network device for establishing a data plane with the first network device;
   receiving, at the controller through the control plane, second security association parameters from a second network device for establishing the data plane with the second network device;
   determining, at the controller that the first network device and the second network device are permitted to connect to each other via the data plane extending, at least in part, through a second network, based on the first network device and the second network device being associated with a same entity, wherein the control plane provides a disassociated path function with respect to the data plane extending, at least in part, through the second network; and
   sending, from the controller to the second network device over the control plane, the first security association parameters for establishing the data plane with the first network device through the second network.

2. The method of claim 1, further comprising refraining, by the controller, from sending the first security association parameters to the second network device through the second network.

3. The method of claim 1, wherein the second network is a public network.

4. The method of claim 1, wherein the first network is a private network.

5. The method of claim 1, further comprising sending, from the controller to the first network device over the control plane, the second security association parameters for establishing the data plane with the second network device through the second network.

6. The method of claim 1, wherein the first network device and the second network device are configured to refrain from establishing one or more control plane channels in the control plane between each other.

7. The method of claim 1, further comprising:
   receiving, at the controller from the second network device over the control plane, a symmetrical key of a pair of symmetrical keys generated by the second network device as part of the first security association parameters, wherein the pair of symmetrical keys is generated for establishing the data plane with the second network device; and
   sending, from the controller to the first network device over the control plane, the symmetrical key for establishing the data plane with the second network device through the second network based on the pair of symmetrical keys.

8. A system comprising:
one or more processors of a controller of a first network; and
a non-transitory computer-readable medium comprising instructions stored therein, which when executed by the one or more processors, cause the controller to:
receive, through a control plane, first security association parameters from a first network device for establishing a data plane with the first network device;
receive, through the control plane, second security association parameters from a second network device for establishing the data plane with the second network device;
determine that the first network device and the second network device are permitted to connect to each other via the data plane extending, at least in part, through a second network, based on the first network device and the second network device being associated with a same entity, wherein the control plane provides a disassociated path function with respect to the data plane extending, at least in part, through the second network; and
send, to the second network device over the control plane, the first security association parameters for establishing the data plane with the first network device through the second network.

9. The system of claim 8, wherein the instructions which when executed by the one or more processors, further cause the controller to refrain from sending the first security association parameters to the second network device through the second network.

10. The system of claim 8, wherein the second network is a public network.

11. The system of claim 8, wherein the first network is a private network.

12. The system of claim 8, wherein the instructions which when executed by the one or more processors, further cause the controller to send to the first network device over the control plane the second security association parameters for establishing the data plane with the second network device through the second network.

13. The system of claim 8, wherein the first network device and the second network device are configured to refrain from establishing one or more control plane channels in the control plane between each other.

14. The system of claim 8, wherein the instructions which when executed by the one or more processors, further cause the controller to:
receive from the second network device over the control plane a symmetrical key of a pair of symmetrical keys generated by the second network device as part of the first security association parameters, wherein the pair of symmetrical keys is generated for establishing the data plane with the second network device; and
send to the first network device over the control plane the symmetrical key for establishing the data plane with the second network device through the second network based on the pair of symmetrical keys.

15. A non-transitory computer-readable storage medium comprising instructions stored therein, which when executed by one or more processors, cause the one or more processors to:
receive, at a controller of a first network through a control plane, first security association parameters from a first network device for establishing a data plane with the first network device;
receive, at the controller through the control plane, second security association parameters from a second network device for establishing the data plane with the second network device;
determine, at the controller that the first network device and the second network device are permitted to connect to each other via the data plane extending, at least in part, through a second network, based on the first network device and the second network device being associated with a same entity, wherein the control plane provides a disassociated path function with respect to the data plane extending, at least in part, through the second network; and
send, from the controller to the second network device over the control plane, the first security association parameters for establishing the data plane with the first network device through the second network.

16. The non-transitory computer-readable storage medium of claim 15, wherein the second network is a public network and the first network is a private network.

17. The non-transitory computer-readable storage medium of claim 15, wherein the instructions which when executed by the one or more processors, further cause the controller to refrain from sending the first security association parameters to the second network device through the second network.

18. The non-transitory computer-readable storage medium of claim 15, wherein the instructions which when executed by the one or more processors, further cause the controller to send to the first network device over the control plane the second security association parameters for establishing the data plane with the second network device through the second network.

* * * * *